Jan. 11, 1938. C. V. McINTIRE Re. 20,619

COLLECTOR MAIN VALVE ASSEMBLY

Original Filed Aug. 11, 1932

INVENTOR
Charles V. McIntire
BY Forbes Sibley
ATTORNEY

Reissued Jan. 11, 1938

Re. 20,619

UNITED STATES PATENT OFFICE 20,619

COLLECTOR MAIN VALVE ASSEMBLY

Charles Vernon McIntire, Shorthills, N. J., assignor to Semet-Solvay Engineering Corporation, New York, N. Y., a corporation of New York Original No. 2,027,548, dated January 14, 1936, Serial No. 628,343, August 11, 1932. Application for reissue September 16, 1937, Serial No. 164,200

17 Claims. (Cl. 202—256)

This invention relates to improvements in apparatus for the recovery of by-products from coal distillation and is especially directed to a new and improved device for shutting off the flow of gas between ovens or coking chambers of a coal distillation plant and the collecting main.

In accordance with the present invention the uptake pipe or standpipe of the coal distillation chamber is provided with a connection with the collecting main which permits the introduction of gases into one side of the collecting main and provides a water seal for preventing flow of gases through this connection while the coking chambers are being charged.

It is an object of the invention to provide a lower type of goose-neck construction than that customarily employed so that the top may be placed within easy reach of the operator, making possible more convenient operation and less laborious cleaning and maintenance of this part of the structure.

A further object of the invention is to make possible the utilization of simple castings for the uptake pipe and liquid seal assembly.

A still further object is to provide a simple and efficient liquid seal assembly which will operate satisfactorily under the severe operating conditions to which such a structure is subjected and which will not require frequent attention.

In accordance with the present invention the liquid seal assembly may be welded or otherwise secured to one side of the collecting main. This assembly comprises a hood extending downwardly within the collecting main and a basin directly beneath the hood and having a lip surrounding the hood in such a manner that when filled with liquid it provides in cooperation with the hood a liquid seal between the collecting main and the conduit leading to the oven or retort. The basin is provided with efficient valve means which permits the ready removal of liquid therefrom to break the seal and permit flow of gas into the collector main. The valve is constructed and arranged so as to be substantially completely out of the path of flow of the hot gases and be less subject to practical operating difficulties than apparatus of previously known design. Provision is made for the effective flushing of the uptake pipe and liquid seal equipment by means of spray heads suitably arranged.

Figure 1:
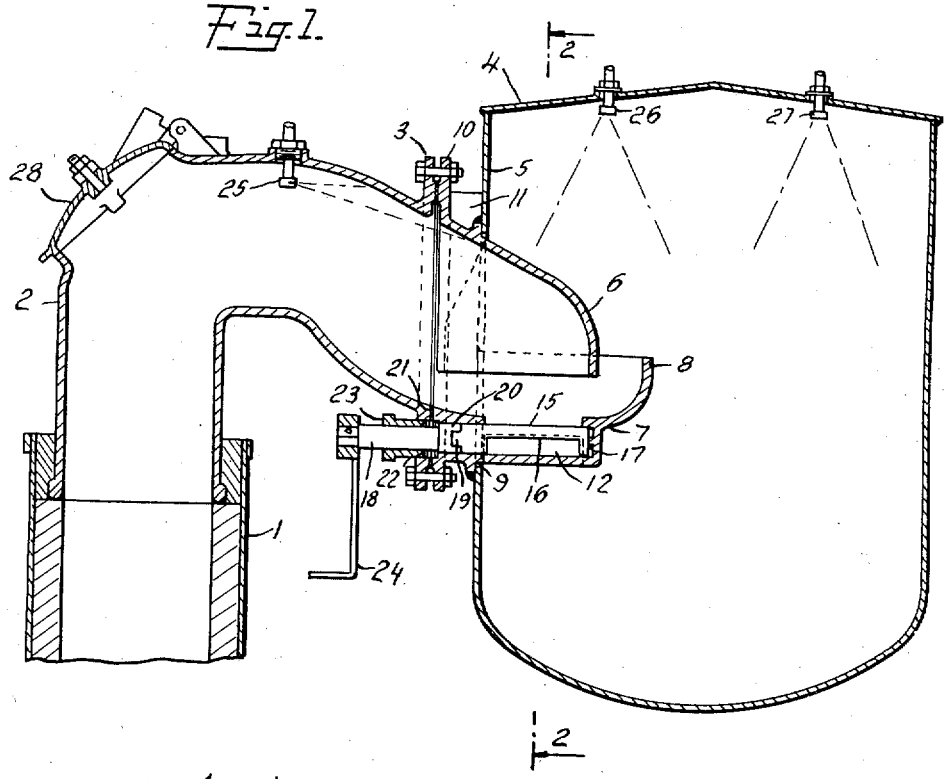
Fig. 1 is a vertical section through an uptake pipe and collector main assembly constructed in accordance with my invention.

In the illustrated embodiment of my invention numeral 1 designates the uptake pipe of a coking chamber of a coke oven battery (not shown). Connected with the uptake pipe 1 there is provided a goose neck member 2 having a flange 3 at the end remote from the uptake pipe, the flanged portion being connected with the relatively short vertically extending portion leading from the uptake pipe by a substantially horizontally extending portion. The collector main 4 is provided on one of the vertical walls 5 beneath the top thereof, with an inwardly extending arcuate shaped hood 6 and directly beneath the hood 6 with an arcuate shaped basin 7 having an upwardly extending lip 8. The basin 7 is so positioned beneath the hood 6 that when filled with liquid it provides a liquid seal for the opening beneath the hood 6 and when the seal is broken gas may escape from the front and both sides of basin 7 into the collector main. The hood 6 and basin 7 may be a single unitary casting which is adapted to fit within aperture 9 in the wall 5. This casting may be provided with an outer flange 10 adapted to form a union with the flange 3 of the goose-neck member 2. The casting may be provided with stiffening ribs 11 to overcome any tendency to warp due to the intense heat to which the apparatus may be subjected.

The basin or underlip 7 may be suitably provided with a valve for controlling the flow of liquid therefrom. The valve illustrated in the drawing and constituting the preferred embodiment of my invention comprises a valve cylinder or seat 12 beneath the basin 7 and cast integrally therewith. The valve cylinder 12 has a longitudinal opening 13 communicating with the upper side of the basin 7 so that liquid may drain from the basin into the cylinder 12. On its lower side the cylinder 12 is provided with a second longitudinal opening 14 to permit liquid to flow from the cylinder into the collector main.

Figure 2:
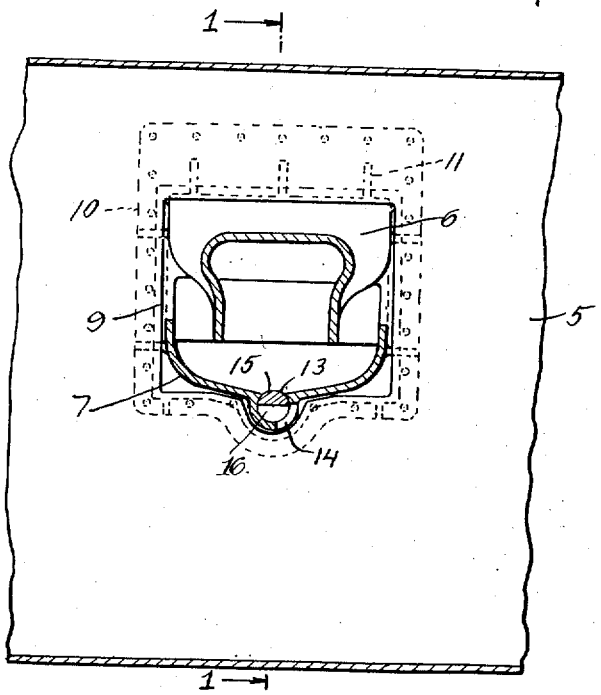
Fig. 2 is a sectional elevation on line 2—2 of Fig. 1.

Within the valve cylinder 12 there is provided a rotatable valve closure or stem 15 of generally cylindrical contour and having a semi-cylindrical cut out portion 16. The valve closure is adapted, when positioned as shown in the drawing, to close the opening 13 to prevent the flow of liquid from the shelf 7 to the valve cylinder 12. When the valve gate is rotated axially a quarter turn counterclock-wise, from the view shown in Fig. 2, the cut-away portion of the valve gate or stem permits the passage of liquid through the opening 13 to the cylinder 12 and from the cylinder 12 through opening 14 to the collector main. The valve gate 15 in cylinder 12 may be provided with a thrust bearing 17 at one end thereof. In the embodiment of the invention illustrated, the valve gate 15 is provided with an operating shaft 18 which is loosely connected to it by means of a tongue 19 engaged by the projections 20 on the shaft 18. A shoulder 21 is provided on this shaft to constitute a thrust bearing to prevent the valve from working out of the valve cylinder, the shoulder 21 bearing against the packing 22 of a packing gland 23. A crank 24, engaging shaft 18 in any suitable manner, may be provided for rotating the valve member 15. The valve member 15 and its operating shaft 18 may, if desired, be made in a single unit. They are, however, shown as two pieces in the preferred embodiment of this invention so that they may be readily removed without interference by the adjacent uptake pipe.

A spray head 25 is located within the conduit or goose-neck 2 and is adapted to continuously project a liquid spray against the interior surfaces of the conduit and of the hood 6. The liquid from this spray collects on bowl 7 when valve stem 15 is in closed position forming a liquid seal. To break this seal and thus permit flow of gas into the collector main, it is only necessary to turn valve stem 15 into position so that openings 14 and 13 are in communication with each other through cut-out portion 16.

Additional spray heads 26 and 27 may be provided in the collector main and may be so located that they will project a spray of liquid against the outer surface of the hood 6 within the collector main and also against the surface of the basin or underlip 7 which are in contact with the hot gases in the collector main. Hence the basin is supplied with liquid not only from sprays 25 but also from sprays 26 and 27. It is consequently rapidly filled whenever it is desired to establish the liquid seal to prevent flow of gas into collector main from the uptake pipe.

By properly locating the spray heads, all parts of the liquid seal assembly may be continually sprayed with cleaning or cooling fluid and the accumulation and coking of pitch on these parts is thus prevented. The valve cylinder 12 is so constructed that at each operation of the valve gate the walls of the cylinder are cleaned; consequently no substantial deposits of coke and pitch can take place on this surface. However, a suitable clean-out door 28 is provided on conduit 2 for permitting access to the interior of the assembly in order to effect any cleaning or other work which may be necessary or desirable during the operation of the unit.

The shelf 7, it will be noted, projects within the collector main, and when the seal is broken, gas flows from three sides of the shelf into the collector main. Hence the outlet capacity of the uptake pipe and connecting goose-neck member is sufficient to accommodate the gas generated in the coking or carbonizing chamber. In prior types of liquid sealed uptake pipes a baffle was provided extending from the top of the discharge section of the uptake into a pocket disposed exteriorly of the collector main and adjacent thereto. Gas flowing through the discharge section of the uptake was discharged therefrom in but one direction of flow into the collector main and not from three sides as in the invention herein. Consequently, to provide the necessary space for the discharge opening large enough to accommodate the gas generated in the carbonizing chambers and the space for the pocket in which the liquid forming the liquid seal is collected, it was necessary to use a relatively tall uptake pipe the discharge end of which communicating with the collector main was of relatively large area in cross section. In counter distinction this invention permits the use of a much lower uptake pipe the discharge end of which in cross section is of relatively small area.

It will be further noted that the collector main has but a single opening through which the unitary casting of comparatively simple construction extends; consequently, this invention results in a simplification of the casting and collector main structure particularly as compared with prior constructions comprising collector mains having two openings with which the gas inlet and the liquid drain outlet of a rather complicated casting communicates.

It will be further noted that parts of valve 15 are disposed substantially out of contact with the gases flowing into the collector main; are continuously flushed with liquor from sprays 25, 26, and 27, and when the liquid seal is formed, are immersed in the liquid constituting the seal. Thus the valve parts are effectively protected against the high temperatures prevailing in the uptake pipe and against the corrosive and erosive effects of the gases. Hence the effective life of the valve and uptake pipe assembly is prolonged.

While I have described quite specifically in detail the preferred embodiment of my invention, it is understood that various modifications may be made without deviating from the invention as defined in the appended claims.

I claim:

1. In a gas collecting system for a coal distillation plant, a collecting main, a gas conduit leading laterally through a side wall of said collecting main and provided with a hood extending into the main, a member within the main beneath said hood adapted to cooperate therewith to form a liquid seal for preventing flow of gas therethrough into the collecting main, and means for breaking said liquid seal to permit the flow of gas into the collecting main.

2. In a gas collecting system for a coal distillation plant, a collecting main, a gas conduit leading laterally through a side wall of said collecting main beneath the top thereof and provided with a hood extending into the main and a member within the main positioned beneath said hood, said member being of greater size than said hood so that a space is provided between said member and hood on three sides, means for introducing liquid into said member into which said hood projects for forming a liquid seal, and means for removing liquid therefrom to break the seal.

3. In a gas collecting system for a coal distillation plant, in combination a collecting main, a short vertically extending gas conduit having a substantially horizontal portion leading into one side of said collecting main and provided with a hood extending into the main, a member within the main beneath said hood adapted to receive liquid into which said hood projects to form a liquid seal, a liquid outlet in said member, and means for controlling flow through said outlet.

4. In a gas collecting system for a coal distillation plant, in combination a collecting main, a relatively short vertically extending gas conduit having a substantially horizontal portion leading into one side of said collecting main and provided with a hood extending into the main, a member within the main beneath said hood adapted to receive liquid into which said hood projects to form a liquid seal, a liquid outlet in said member, means for controlling flow through said outlet, comprising a rotatable valve member disposed in the base portion of said member out of substantial contact with the gas in the gas conduit when said member contains sufficient liquid to form said seal, adapted when in one position to close said outlet and when in another position to open said outlet.

5. In a gas collecting system for a coal distillation plant, a collecting main, a gas conduit leading laterally through a side wall of said collecting main and provided with an arcuate shaped hood extending into the main, an arcuate shaped member within the main beneath said hood arranged to hold liquid into which said hood projects to form a liquid seal, said hood and member being open at three sides thereof to permit flow of gas into the collecting main when the seal is broken, and means for flushing said hood.

6. A coal distillation plant gas collecting main having in a side wall thereof an aperture, a gas conduit extending laterally through said aperture into said collecting main and having an open end facing downwardly therein, and an underlip surrounding said open end and spaced therefrom and adapted to cooperate with the end of said conduit to form a liquid seal, said gas conduit and underlip extending into the collecting main only sufficiently so that three sides thereof are within the main.

7. A coal distillation plant gas collecting main having in one side thereof an aperture, a substantially horizontally extending gas conduit passing through said aperture into said collecting main and having an open end facing downwardly therein and an underlip within the main surrounding said open end and spaced therefrom and adapted to form a liquid seal therefor, a substantially horizontal valve cylinder on said underlip, having a longitudinal opening communicating with the upper side thereof and a second longitudinal opening communicating with the interior of the collecting main beneath said underlip, the cylinder thus providing a passage from the first longitudinal opening to the second longitudinal opening, a valve closure having a substantial portion of its surface cylindrical, said closure being rotatable within the cylinder so that it is adapted in one position to close the opening and in another position to permit the passage of liquid therethrough, and means located externally of said collecting main for rotating said closure.

8. A coal distillation plant gas collecting main having in one side thereof an aperture, a gas conduit extending laterally through said aperture into said collecting main and having an open end facing downwardly therein and an underlip within the main surrounding said open end and spaced therefrom and adapted to form a liquid seal therefor, means for spraying a liquid against surfaces of said conduit and means for supplying liquid to said underlip, a substantially horizontal valve cylinder on said underlip having a longitudinal opening communicating with the upper side thereof and a second longitudinal opening communicating with the interior of the collecting main therebelow, the cylinder thus providing a passage from the first longitudinal opening to the second longitudinal opening, a valve closure of substantially semi-cylindrical form, said closure being adapted to rotate axially in the valve cylinder so that it is adapted in one position to block the passage but in another position to permit the flow of liquid therethrough, a rotatable shaft extending externally of said collecting main and adapted to actuate said closure, and means for rotating said shaft.

9. In a coal distillation plant uptake pipe-collecting main assembly, a gas conduit leading into the main and provided with a hood extending into the main and a member within the main beneath said hood arranged to contain a body of liquid for forming with said hood a liquid seal and having an elongated aperture through the bottom of said member for draining liquid therefrom into the bottom of the collector main, a rotatable member arranged so that in one position it constitutes a closure for said aperture but when rotated to a second position it clears said aperture to permit drainage therethrough, means for rotating said member, said means being located externally of said collecting main and out of contact with gases passing through the uptake pipe, and means for flushing said rotatable member when in said second position so as to avoid exposure thereof to direct contact with hot gases passing through the uptake pipe.

10. In a gas collecting system for a coal distillation plant, a collecting main, a gas conduit leading laterally through a side wall of said collecting main and provided with a hood extending into the main, a member within the main beneath said hood adapted to cooperate therewith to form a liquid seal for preventing flow of gas therethrough into the collecting main, a longitudinal opening providing communication between the space above said member and the space therebelow within said collecting main, and a valve closure having a substantial portion of its surface cylindrical, said closure being rotatable so that in one position it is adapted to block said longitudinal opening but in another position to permit flow of liquid therethrough.

11. In a coke oven battery, a collecting main, a short vertically extending gas conduit leading from a coking chamber of said battery and having its top disposed beneath the top of said collecting main, a gas conduit leading laterally from the top of said short gas conduit and extending through a side wall of said collecting main so that the terminal portion thereof is disposed within the collecting main, a member within the collecting main for collecting liquid into which said terminal portion extends to form a liquid seal which prevents flow of gas through said terminal portion into said collecting main and means to cause the liquid to drain from said member to break said liquid seal to permit the flow of gas through said terminal portion into said collecting main.

12. In a gas collecting system for a coal distillation plant, a collecting main, a gas conduit extending laterally through a side wall of and projecting into said collecting main, said conduit being provided with a flange abutting the exterior of said collecting main, a member located within said main below the portion of the conduit projecting into the main adapted to collect liquid into which said projecting portion extends to form a liquid seal for said conduit, and means to cause liquid to drain from said member to break said liquid seal to permit the flow of gas into the collecting main.

13. In a coke oven battery, a collecting main, a short vertically extending gas conduit disposed close to said collecting main leading from a coking chamber of said battery and having its top positioned beneath the top of said collecting main, a gas conduit leading laterally from the top of said short gas conduit and extending through a side wall of said collecting main so that the terminal portion thereof is disposed within the collecting main, means to spray liquid downwardly through said laterally extending gas conduit, means within the collecting main disposed below said spray means for collecting said liquid into which said terminal portion extends to form a liquid seal which prevents flow of gas through said terminal portion into said collecting main and means for breaking said liquid seal to permit flow of gas through said terminal portion into said collecting main.

14. In a gas collecting system for a coal distillation plant, a collecting main, a relatively short uptake pipe, the top of which is disposed substantially below the top of said collecting main, a goose-neck conduit comprising a relatively short vertical portion connected to said uptake pipe and a portion extending from the top of said vertical portion laterally through a side wall of and into the interior of said main, the top of said goose-neck conduit being located at a level lower than the top of said collecting main, a member within the collecting main adapted to collect liquid into which extends the terminal portion of said goose-neck conduit disposed within said collecting main to form a liquid seal for preventing flow of gas through said goose-neck into said collecting main, and means for breaking said liquid seal to permit the flow of gas through said goose-neck into said collecting main.

15. In a gas collecting system for a coal distillation plant, a collecting main, an uptake pipe which does not rise substantially higher than the collecting main, and which connects laterally therewith through a side wall of said main, said uptake pipe having extending from said wall a downwardly directed portion disposed within the collecting main and constituting a discharge outlet for discharge of gas from said uptake pipe into said collecting main, said downwardly directed portion being positioned close to said side wall so as to leave the major portion of the cross-section of the interior of the main unobstructed by said portion extending within the collecting main, a member within the main beneath said portion adapted to collect liquid into which the downwardly directed portion extends to form a liquid seal, means adapted to fill said member with liquid to form said seal and means for emptying said member to break said seal.

16. In a gas collecting system for a coal distillation plant, a collecting main, an uptake pipe which does not rise substantially higher than the collecting main, and which connects laterally therewith through a side wall of said main and which is provided with a downwardly curved extension within the collecting main, and a basin-like member within the main beneath said extension adapted to collect liquid into which extends the outlet of said extension to form a liquid seal, spray means adapted to fill said basin-like member to form the seal, and means for emptying said basin to break the seal.

17. In a coke oven battery, a collecting main, a gas conduit extending laterally through a side wall of and projecting into said collecting main, means disposed within said collecting main for spraying liquid, a member within the collecting main disposed to collect liquid discharged by said spray means into which liquid the terminal portion of said laterally extending gas conduit extends to form a liquid seal which prevents flow of gas through said terminal portion into said collecting main, and means for breaking said liquid seal to permit flow of gas through said terminal portion into said collecting main.

CHARLES VERNON McINTIRE.